(12) United States Patent
Caffiau et al.

(10) Patent No.: US 9,248,591 B2
(45) Date of Patent: Feb. 2, 2016

(54) FIBER APPLICATION HEAD INCLUDING A SEGMENTED COMPACTION ROLLER

(75) Inventors: Johann Caffiau, Hennebont (FR); Loïc Gaillard, Lanouee (FR); Yvan Hardy, Lorient (FR)

(73) Assignee: Coriolis Composites, Lyons (FR)

( * ) Notice: Subject to any disclaimer, the term of this patent is extended or adjusted under 35 U.S.C. 154(b) by 61 days.

(21) Appl. No.: 14/118,396

(22) PCT Filed: May 15, 2012

(86) PCT No.: PCT/FR2012/000194
§ 371 (c)(1),
(2), (4) Date: Nov. 18, 2013

(87) PCT Pub. No.: WO2012/160269
PCT Pub. Date: Nov. 29, 2012

(65) Prior Publication Data
US 2014/0083620 A1    Mar. 27, 2014

(30) Foreign Application Priority Data

May 20, 2011 (FR) ...................................... 11 54448

(51) Int. Cl.
*B29C 70/38* (2006.01)
*B29C 43/22* (2006.01)

(52) U.S. Cl.
CPC ................. *B29C 43/22* (2013.01); *B29C 70/38* (2013.01); *B29C 70/384* (2013.01); *B29C 70/388* (2013.01)

(58) Field of Classification Search
CPC .. B29C 70/382; B29C 70/384; B29C 70/386; B29C 70/388
See application file for complete search history.

(56) References Cited

U.S. PATENT DOCUMENTS

| 4,292,108 | A | * | 9/1981 | Weiss et al. ................... 156/259 |
| 4,714,509 | A |   | 12/1987 | Gruber |
| 4,750,965 | A | * | 6/1988 | Pippel et al. .................. 156/361 |
| 4,881,998 | A |   | 11/1989 | Youngkeit |
| 5,015,326 | A |   | 5/1991 | Frank |
| 5,058,497 | A | * | 10/1991 | Bishop et al. ............. 100/155 R |
| 5,110,395 | A |   | 5/1992 | Vaniglia |
| 5,200,018 | A |   | 4/1993 | Gill et al. |
| 5,314,563 | A | * | 5/1994 | Grimshaw et al. ............ 156/358 |

(Continued)

FOREIGN PATENT DOCUMENTS

WO WO 2006/092514 A2  9/2006
WO WO 2010/108792 A1  9/2010

OTHER PUBLICATIONS

Application and File History for U.S. Appl. No. 12/628,4497 (now U.S. Pat. No. 8,191,596) filed Dec. 1, 2009, inventors Hamlyn et al.

(Continued)

*Primary Examiner* — Jeff Aftergut
(74) *Attorney, Agent, or Firm* — Patterson Thuente Pedersen, P.A.

(57) ABSTRACT

A fiber application head for a fiber application machine for the production of parts made of composite materials, comprising a compacting roller, said compacting roller comprising several independent roller segments mounted side by side on an axial rod. Each roller segment comprises a tubular central portion through which said segment is mounted on the axial rod, a tubular peripheral portion having a cylindrical outer surface and one or more curved spring plate arranged between the outer surface (31a) of the central portion and the inner surface of the peripheral portion.

17 Claims, 5 Drawing Sheets

(56) References Cited

U.S. PATENT DOCUMENTS

| | | | |
|---|---|---|---|
| 5,454,897 A * | 10/1995 | Vaniglia | 156/166 |
| 5,587,041 A | 12/1996 | Sandusky et al. | |
| 5,645,677 A | 7/1997 | Cahuzac et al. | |
| 5,766,357 A | 6/1998 | Packer et al. | |
| 5,979,531 A | 11/1999 | Barr et al. | |
| 6,096,164 A | 8/2000 | Benson et al. | |
| 6,390,169 B1 | 5/2002 | Johnson | |
| 6,808,378 B2 | 10/2004 | Wirth et al. | |
| 7,819,160 B2 | 10/2010 | Hamlyn et al. | |
| 8,042,594 B2 * | 10/2011 | Miller et al. | 156/582 |
| 8,052,819 B2 | 11/2011 | Munaux et al. | |
| 8,057,618 B2 | 11/2011 | Hamlyn et al. | |
| 8,191,596 B2 | 6/2012 | Hamlyn et al. | |
| 8,493,725 B2 | 7/2013 | Wu et al. | |
| 8,667,999 B2 | 3/2014 | Hamlyn et al. | |
| 8,893,758 B2 * | 11/2014 | Genssen | 156/433 |
| 2006/0127635 A1 | 6/2006 | Colson et al. | |

OTHER PUBLICATIONS

Application and File History for U.S. Appl. No. 13/126,736 (now U.S. Pat. No. 8,667,990) filed Aug. 2, 2011, inventors Elamivn et al.

* cited by examiner

FIBER APPLICATION HEAD INCLUDING A SEGMENTED COMPACTION ROLLER

PRIORITY

The present application is a National Phase entry of PCT Application No. PCT/EP2012/000194, filed May 15, 2012, which claims priority from FR Patent Application No. 1154448, filed May 20, 2011, which applications are hereby incorporated by reference in their entireties.

FIELD OF THE INVENTION

The present invention relates to a fiber application head for a fiber application machine for the production of parts made of composite materials, and more particularly to a head with a so-called segmented compacting roller comprising several independent rollers segments.

BACKGROUND OF THE INVENTION

There have been known fiber placement machines, commonly called fiber placement machines, for the application, by contact onto a layup tool, such as a male or female mold, of a wide band of several flat continuous fibers, ribbon-like, dry or impregnated with thermosetting or thermoplastic resin, in particular carbon fibers, consisting of a plurality of carbon filaments or threads.

These machines are used to produce preforms formed of several superposed plies, each ply being formed by laying up on a mold of one or several contiguous bands. In the case of a layup of fiber pre-impregnated with resin, the so-called pre-impregnated preform, is cured or polymerized by passing through an oven to obtain a composite material part. In the case of so-called dry fiber, not pre-impregnated with resins, comprising possibly a very small amount of so-called bonding resin, to impart tackiness to the fibers during the laying up, resin is injected or infused into the dry preform before the curing step.

These machines, such as described in the patent document WO2006/092514, typically comprise a fiber application head, a system of moving said fiber application head, fiber storage means, and fiber conveying means for conveying fibers from said storage means to the application head.

The fiber application head typically comprises an application roller, also called a compacting roller, intended to come into contact against the mold to apply the band, and means for guiding the fibers onto said application roller. The head generally further comprises a heating system for heating the fibers. The compacting roller presses the fiber band against the mold application surface, or against the fiber band or bands deposited beforehand, in order to facilitate the adhesion of the deposited bands between each other, and so that air trapped between the deposited bands is progressively discharged. The heating system heats the band of fibers, and/or the mold or the bands already applied upstream of the compacting roller, just before the compacting of the band, so as to at least soften the pre-impregnation resin or the binder resin, and thus promote the adhesion of the bands between each other.

The moving system ensures the movement of the application head in at least three directions perpendicular to each other. The moving system can be formed by a polyarticulated arm of the type of a standard six axes robot, arranged on the ground or mounted on a linear axis, with a wrist end to which the application head is fixed, or by a gantry type Cartesian robot, equipped with a wrist end carrying the application head.

In the case of fibers packaged in the form of spools, the fiber storing means typically comprises a creel or spool cabinet. The creel may be arranged on the ground close to the application head, for example in the case of a fixed standard robot, or can be mounted on an element of the moving system, for example on one of the carriages of a Cartesian robot or on the follower carriage sliding on the linear axis of the standard robot.

In order to ensure a substantially uniform compacting over the entire width of the band, the fiber placement head advantageously comprises a compacting roller able to adapt to the application surface, in particular to convex and/or concave application surfaces.

In the case of thermosetting resins, the pre-impregnated fibers are only heated to be softened, typically at temperatures of about 40° C. At these temperatures, the compacting roller is advantageously made of a so-called flexible material, elastically deformable, typically of an elastomeric material, so as to deform by matching the profile of the said surfaces.

In the case of thermoplastic resins, pre-impregnated fibers have to be heated to higher temperatures, at least up to the resin melting temperature, that is, of about 200° C. for nylon-type resins, and up to about 400° C. for PEEK-type resins. Because of the high heating temperatures, the fiber placement heads are equipped with metal compacting rollers, resistant to heat.

To adapt to the profile of the application surface, there have been proposed, particularly in the patent document U.S. Pat. No. 6,390,169, segmented metallic compacting rollers comprising several independent roller segments mounted side by side on a same axial rod, each segment being movable in said axial rod, perpendicularly the latter, independently, and being elastically biased against the application surface by elastic means, such as expansible bag systems.

Nevertheless, the structure of such segmented metallic rollers and their implementation proved to be complex.

SUMMARY OF THE INVENTION

The purpose of the present invention is to provide a solution to overcome the aforementioned drawbacks, particularly making it possible to implement a wide variety of resins, ranging from thermosetting and thermoplastic ones, with a substantially uniform compacting of the applied band and which can be designed and made easily.

To this end, the present invention provides a fiber application head for fiber application machine comprising a compacting roller, said compacting roller comprising several independent roller segments mounted side by side on the same axial rod, by the ends of which the compacting roller is mounted, possibly rotating, on a supporting structure of the fiber placement head, characterized in that each roller segment comprises a tubular central portion, of axis A1, of rigid material, whereby said segment is mounted on the axial rod, said central portion having an internal passageway through which passes said axial rod of the roller, a tubular peripheral portion, of axis A2, of rigid material, having a cylindrical outer surface constituting the cylindrical outer surface of the segment whereby said segment is able to come into contact against an application surface, and one or more curved spring plates, also called spiral spring plates, made of rigid material, preferably identical, arranged between the outer surface of the central portion and the inner surface of the peripheral portion.

According to the invention, the fiber application head is equipped with a segmented roller, the peripheral portions of the segments are able to move independently of each other perpendicularly to the axis of the axial rod, due to one or more curved spring plates interposed between said peripheral portions forming the outer surface of the segments coming against the application surface to layup and the tubular central portions of the segments for mounting said segments on the axial rod.

Each spring plate, preferably of rectangular section, is fixed by a first end to the outer surface of the central portion, its second end being in contact with the inner surface of the peripheral portion, and possibly fixed to the latter, the convex surface of the plate being preferably directed outwards.

Such segments, with a spring plate system to allow this freedom of movement perpendicular to the axis of the axial rod, allows one to obtain a compacting roller simple in design and implementation.

A machine with a roller according to the invention offers the possibility of using a wide variety of thermoplastic or thermosetting resins in combination with a wide variety of fibers, synthetic or natural, hybrid or non-hybrid fibers, particularly fibers commonly used in the composite field, such as glass fibers, carbon fibers, quartz fibers, and aramid fibers.

Preferably, each plate extends substantially tangentially from the outer surface of the central portion and substantially tangentially from the inner surface of the peripheral portion.

In the case of a plurality of plates, they are preferably fixed at regular angular intervals on the outer peripheral surface of the tubular portion.

Preferably, the roller segments are identical.

According to one embodiment, each segment comprises a plurality of curved spring plates, preferably each curved spring plate extends over at least a quarter turn of the perimeter of the central portion, preferably over at least one third of a turn of the perimeter, i.e. the so-called plate angle between the point of fixing the spring plate to the central portion and the point of fixing the plate to the peripheral portion is at least 90°, preferably at least 120°, and/or all of the spring plates extending over at least one turn of the perimeter of the central portion, i.e. the sum of said plate angles is greater than or equal to 360°. For example, in the case of three identical flexible plates, each plate extends over at least one third of a turn.

According to one embodiment, each curved spring plate extends over at least one third of a turn of the perimeter of the peripheral portion.

According to another embodiment, each segment comprises a single spring plate with more than one coil, the spring plate extends over more than one turn of the perimeter of the central portion. Said spring plate is a flat spiral spring type, with non-contiguous coil. When the segment is at rest, that is to say no external force is applied to said segment, except its ends fixed to the central portion and the peripheral portion, the plate is not in contact with the outer surface the central portion, nor the inner surface of the peripheral portion, and in the case of a plate with a plurality of coils, the coils are without contact between each other. The spring plate has a substantially radial stiffness identical in all radial directions. According to one embodiment, the curved spring plate comprises less than two coils, i.e. a first complete coil from the central portion, is extended by a second incomplete coil, for example extending over less than half a turn of the perimeter.

According to one embodiment, the thickness of the plate is substantially equal to the thickness of the central portion and the peripheral portion.

According to one embodiment, the curved spring plate or plates are fixed to the central portion and the plate or plates are formed in one-piece.

According to one embodiment, each spring plate extends tangentially from the central portion, said central portion having a substantially circular hole at the junction of the spring plate to the central portion in order to reduce stress concentrations at said junction.

According to another embodiment, each spring plate is formed of a separate part from those forming the central portion and the peripheral portion, each plate preferably being fixed to the central portion by a connecting system, for example of a dovetail type.

According to one embodiment, the peripheral portion is formed of a separate part from that of the central portion, said peripheral portion having for example a U-shaped cross-section.

According to another embodiment, each curved spring plate is fixed by a first end to the outer surface of the central portion, each plate comes against the inner surface of the peripheral portion and is able to slide against the latter, each plate being preferably elastically in abutment against said surface in the rest position of the segment. In the case of a peripheral portion of the U-section, the plate or plates are disposed between the two branches of the U.

According to another embodiment, for each segment, the spring plates are fixed to the peripheral portion and the central portion, the peripheral portion, the central portion and the spring plate or plates are preferably formed in one-piece, the plate or plates being obtained by performing one or more cuts in a disk of rigid material. Preferably, the peripheral portion also comprises one or several circular holes for limiting the stress concentrations at the junction between the spring plate and the peripheral portion.

According to one embodiment, each segment comprises a stop means able to limit the radial movement of the peripheral portion relative to the central portion.

According to one embodiment, the stop means comprise for each segment at least one disk made of rigid material fixed to the central portion and/or mounted on said axial rod, able to abut against a circular part of the internal surface of the peripheral portion, said circular portion being for example formed by the free edge of one sidewall of the U-section peripheral portion.

According to one embodiment, said segments are made from one or more rigid materials, preferably heat-resistant, preferably metallic segments, each formed from one or more metal parts.

The present invention also relates to a fiber application machine comprising
   a fiber application head comprising a compacting roller and means for guiding the fibers onto said application roller, such as a band of several contiguous fibers, and preferably
   a moving system for moving said fiber application head, and possibly fiber storage means and fiber conveying means for conveying the fibers from said storage means to the application head, characterized in that it comprises a head as defined previously.

The present invention also relates to a compacting roller as described previously for a fiber application head.

BRIEF DESCRIPTION OF THE DRAWINGS

The invention will be better understood and further aims, details, features and advantages will become more apparent from the following detailed explanatory description of currently preferred particular embodiments of the invention with reference to the accompanying schematic drawings in which.

DETAILED DESCRIPTION OF THE DRAWINGS

Figure 1:
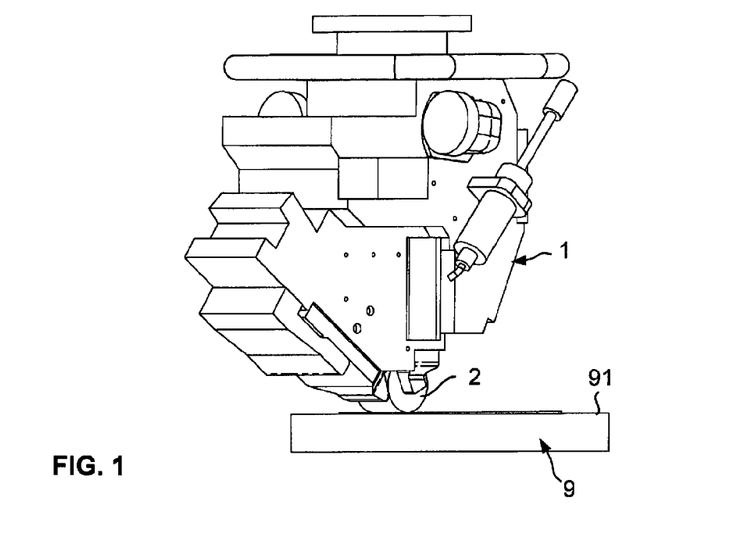
FIG. 1 is a schematic perspective view of a head according to the invention during the application of a band of fibers on a non-planar application surface.
Figure 2:
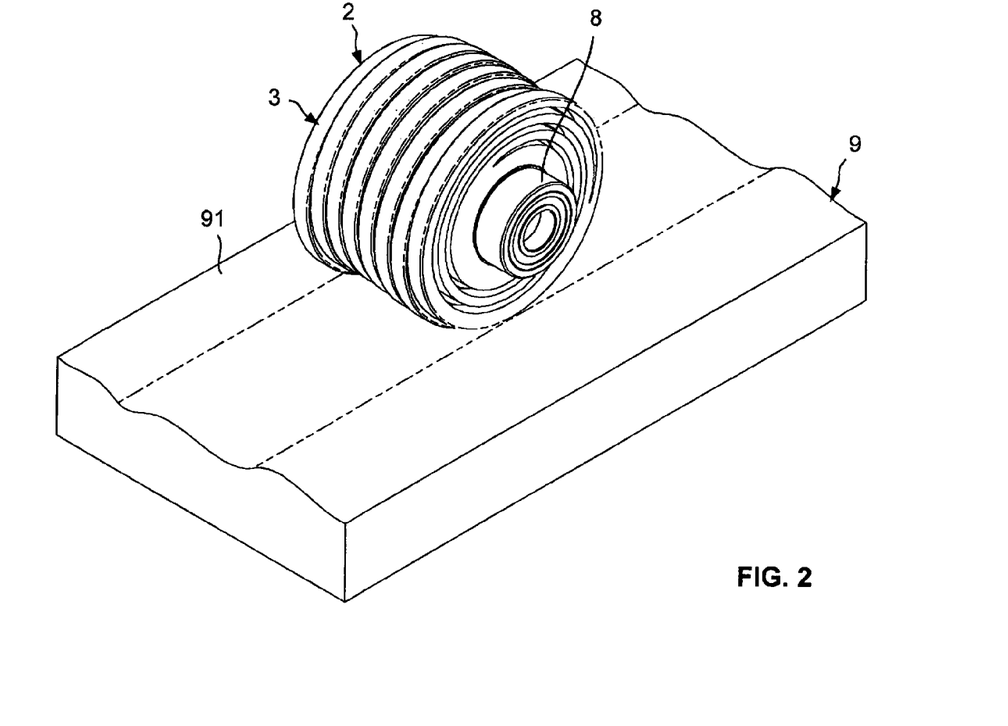
FIG. 2 is a schematic perspective view of the compacting roller of the head of FIG. 1, said roller comprising so-called monoblock segments, with a single spring plate according to a first embodiment.
Figure 3:
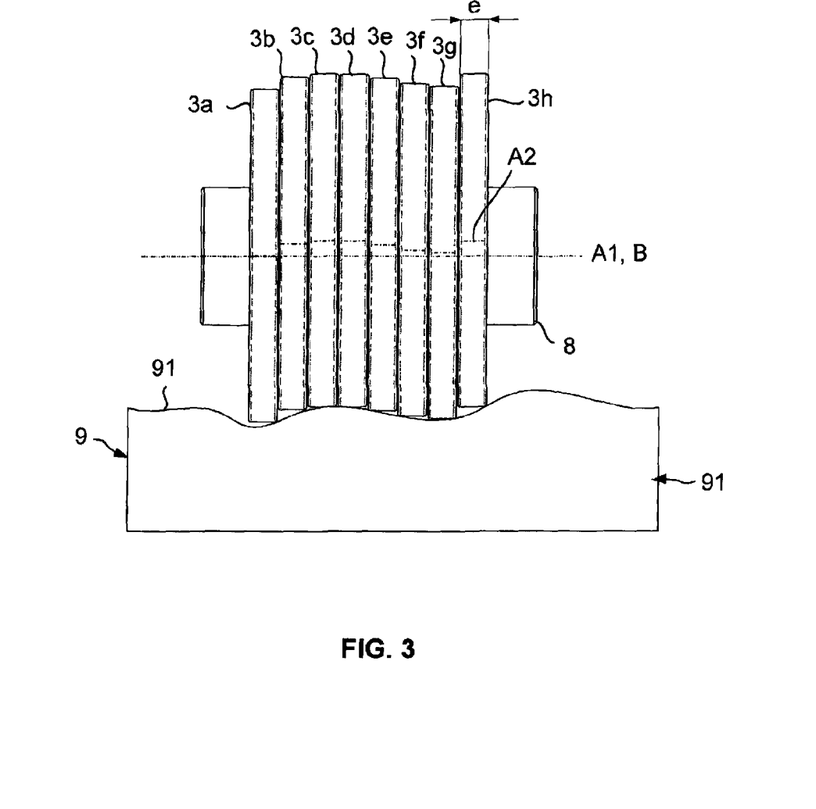
FIG. 3 is a schematic side view of FIG. 1, showing the radial displacement of the peripheral portions of the segments.

With reference to FIGS. 1 to 3, the fiber placement head 1 comprises fiber guiding means and compacting roller 2. The guiding means guides the fibers entering into the head to the compacting roller 2 in the form of a band of fibers, the band fibers being disposed side by side in a substantially contiguous manner. By moving the head 1 by means of an appropriate moving system (not shown) such as a multi-articulated arm, of the six-axis robot type, the compacting roller 2 is brought into contact with the application surface 91 of the layup tool 9 to apply the band formed of several fibers.

The compacting roller 2 according to the invention comprises a plurality of identical roller segments 3 mounted side by side on an axial rod 8 of axis B, for example eight segments, referenced 3a to 3h in FIG. 3.

In a manner known per se, the roller 2 is mounted by the ends of its axial rod 8 to a support structure of the fiber placement head 1. The rod 8 is for example hollow and is formed by a rigid central tube of circular cross section, for example metallic, fitted for example at the end with bearings for its rotating mounting around its axis B on the support structure.

Figure 4:
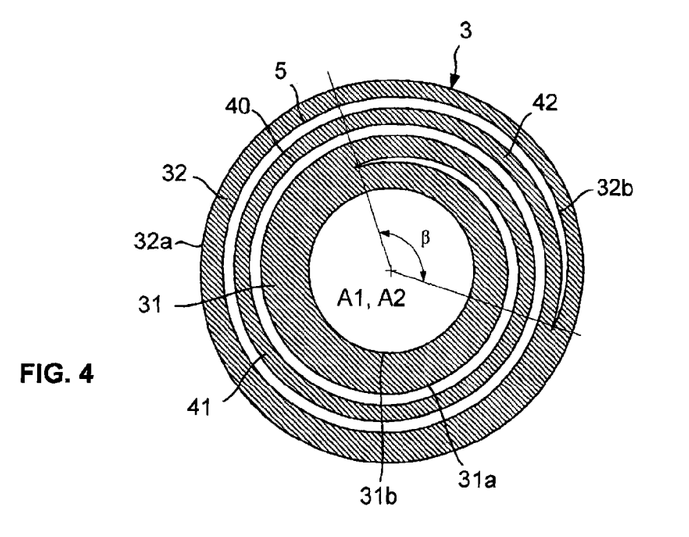
FIG. 4 is a sectional view of a segment of the roller of FIG. 2.

With reference in particular to FIG. 4, each segment 3 comprises a rigid tubular central portion 31 and a rigid tubular peripheral portion 32 coaxial and connected to each other elastically by a spring plate 40, the axis A1 of the central portion 31 and the axis A2 of the peripheral portion being coincident when segment is said to rest, without external force applied to said segment 3.

The central portion 31 has an internal passage 31b of circular cross section through which said segment 3 is mounted on the axial rod, free to rotate. Alternatively, each segment 3 is mounted on the rod by means of a bearing system, in particular of the ball type.

The tubular peripheral portion 32 has a cylindrical outer surface 32a through which said segment 3 is able to come into contact against the application surface.

The spring plate 40, said curved or spiral, is a flat spiral spring type, with non-contiguous coil, rectangular in section, and is assembled by a first end to the outer surface 31a of the central portion 31 and by its second end to the inner surface 32b of the peripheral portion 32, the convex surface of the plate being directed outwards, that is to say the side opposite to the axis A1 of the central portion, to the inner surface of the peripheral portion.

The spring plate 40 extends over more than one turn of the perimeter of the central portion, and thus has a first full coil 41 extending substantially tangentially from the outer surface 31a of the central portion 31, extending by a second incomplete coil or portion of coil 42 extending over about a third of a turn. This portion of the coil extends substantially tangentially from the peripheral portion 32.

The angle β between the area or point of fixing the spring plate 40 to the central portion 31 and the area or point of fixing the plate to the peripheral portion 32 is about 120°.

In this embodiment, the so-called monoblock segment 3 is formed in one-piece, from a metal disk with a thickness e, having two opposed planar main surfaces in which cuts are made to create the internal passage and a spiral slot 5 in order to form the spring plate. The slot 5 has a substantially constant radial dimension or height, except at its end portions, so that the spring plate 40 has a substantially identical radial stiffness in all radial directions.

According to an alternative embodiment, the circular holes (not shown) are formed at the ends of the slot 5 to reduce stress concentrations at said ends, and thus reduce the risk of tearing.

The segments 3 are mounted on the rod 8, substantially flat against each other by their main surfaces, possibly interposing distance washers. To reduce or eliminate the imbalance, the segments are mounted on the axial rod being angularly offset relative to each other so that the center of gravity of all segments 3 is disposed substantially along the axis B of the rod 8. Holding means between two adjacent segments, for example formed by the above-mentioned distance washers enable these angular offsets to be maintained. Alternatively, each segment 3 has holes appropriately formed on the central portion 31 and the peripheral portion 32 whereby the center of gravity of each segment 3 is substantially arranged along the axis B.

The segmented compacting roller 2 adapts to variations in curvature of the application surface, as illustrated in FIG. 3, and thus permits the application of a substantially uniform pressure over the entire laid band. Depending on the application surface under the effect of the compacting force applied by the head, the spring plate 40 is elastically deformed, the peripheral portion 32 of each segment moves radially upward, its axis A2 being shifted relative to the axis B of the rod.

The maximum radial displacement of the central portion 31 is defined by the abutment of the central portion 31 against the first coil 41 of the spring plate 40, this first coil 41 being itself in abutment against the peripheral portion 32, possibly via the portion 42 of the coil interposed between these last two 41, 32.

Figure 5:
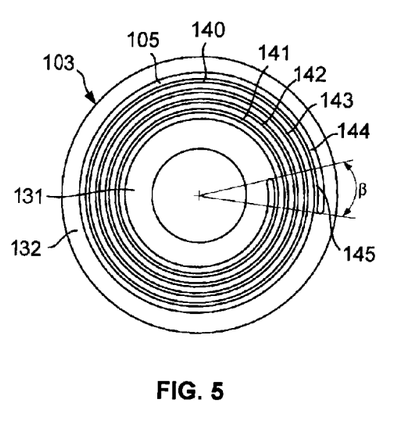
FIGS. 5 and 6 are schematic side views of monoblock segments with a single spring plate in two alternative embodiments.
Figure 6:
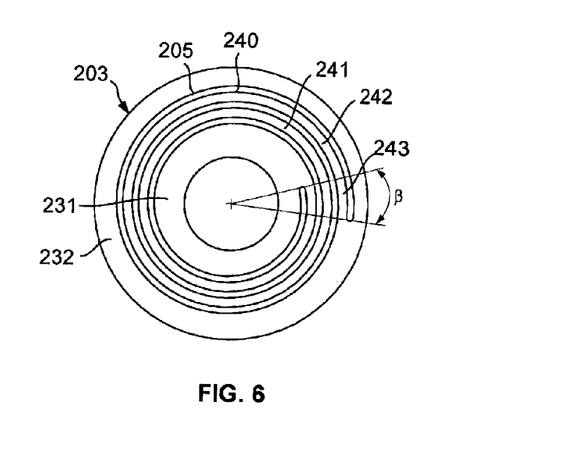

FIGS. 5 and 6 illustrate two alternative embodiments of a monoblock segment 103, 203, wherein the central portion 131, 231 and the peripheral portion 132, 232 are connected to each other by a single coil spring plate comprising more than two coils. The segment 103 of FIG. 5 comprises a spring plate 140 comprising slightly more than four coils, i.e. four complete coils 141-144 and a portion of a coil 145 extending here over an β angle of about 20°. The segment 203 of FIG. 6 comprises a spring plate 204 comprising slightly more than two coils, i.e. two complete coils 241, 242 and a portion of a coil 243 extending over an β angle of about 20°. The segments 103, 203 are formed in one-piece from a disk, the spring plates being obtained by forming a slot 105, 205.

Figure 7:
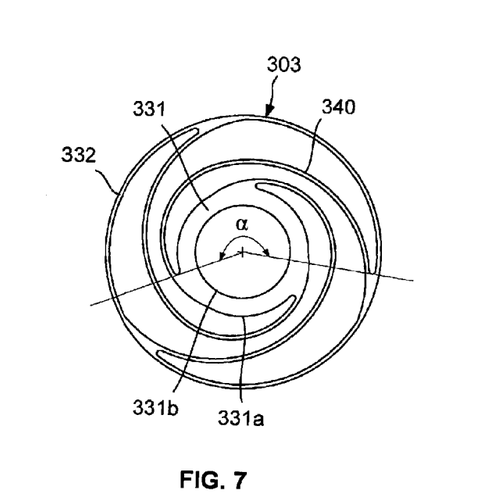
FIG. 7 is a side view of a monoblock segment with several spring plates according to a second embodiment.

FIG. 7 shows a segment 303 of a monoblock roller according to a second embodiment, in which the central portion 331 and the peripheral portion 332 are connected to each other by several spring plates 340. Each spring plate extends over more than half a turn of the perimeter of central portion 331, the angle α between the area of fixing of the spring plate to the central portion and the area of fixing the plate to the inner surface of the peripheral portion is greater than 180°, for example about 210°. The segment comprises three identical spring plates arranged at regular angular spacing from each other, the points of fixing the plate to the central portion being disposed at 120° to each other, the points of fixing the plates to the peripheral portion being arranged at 120° to each other. The segment 303 is formed in one-piece, from a disk, the spring plates 340 being obtained by forming a plurality of cutouts.

Figure 8:
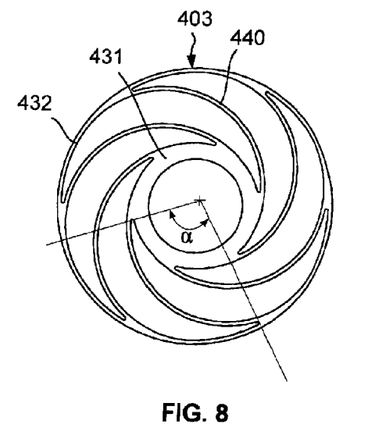
FIG. 8 is a side view of a monoblock segment with several spring plates according to an alternative embodiment.

FIG. 8 illustrates a segment 403 of a monoblock roller with several spring plates 440 according to an alternative embodiment, in which the central portion 431 and the peripheral portion 432 are connected to each other by six identical spring plates 340, points of fixing the plates to the central portion being disposed at 60° to each other. Each spring plate 340 extends over more than one quarter of turn of the perimeter of the central portion 431, the angle α is greater than 90°, for example of about 100°. The segment 403 is formed in one-piece, from a disk, the spring plates being obtained by forming a plurality of cutouts.

FIGS. 9-14 illustrate a segment 503 of a roller according to a third embodiment.

Figure 9:
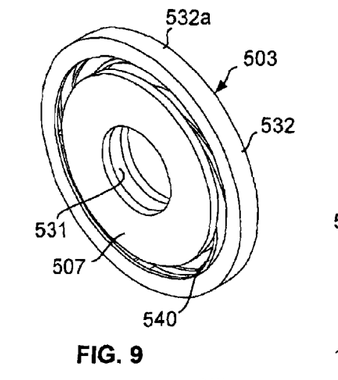
FIG. 9 is a perspective view of a roller segment according to a third embodiment, said segment with several spring plates being formed of several distinct elements.
Figure 10:
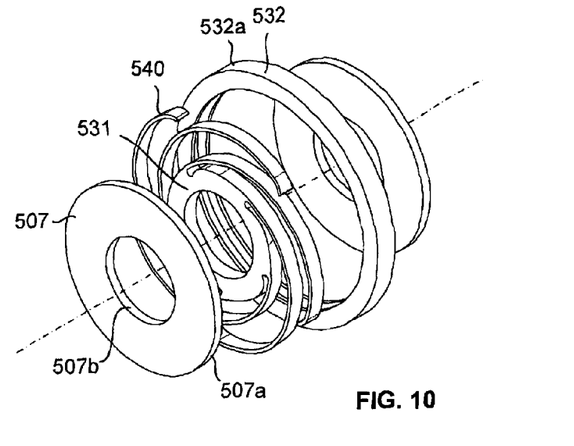
FIG. 10 is an exploded perspective view of the various components constituting the segment in FIG. 9.

The segment includes a central portion 531 of axis A1 and a peripheral portion 532 of axis A2 connected to each other by several spring plates 540, five in number in the illustrated embodiment. The plates are fixed to the central portion, the plate and the central portion being formed from a first metallic part. The peripheral portion is formed from a second metallic part distinct from the first part.

Figure 12:
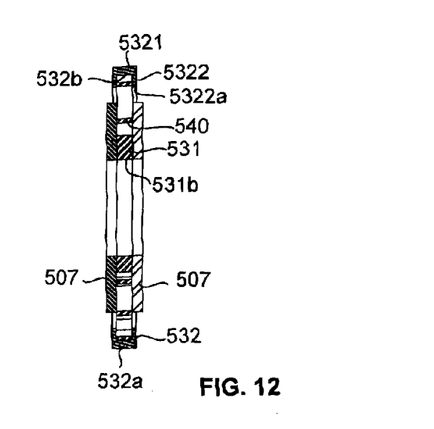
FIG. 12 is a view along the cross-section plane XII-XII of FIG. 11.

The peripheral portion 532 is in the form of a ring having a cross section generally in the shape of a U, with a base 5321, of which the external surface constitutes the cylindrical outer surface 532a by which said segment is able to come into contact against the application surface, and two lateral branches 5322 extending radially inwardly from said base.

Figure 11:
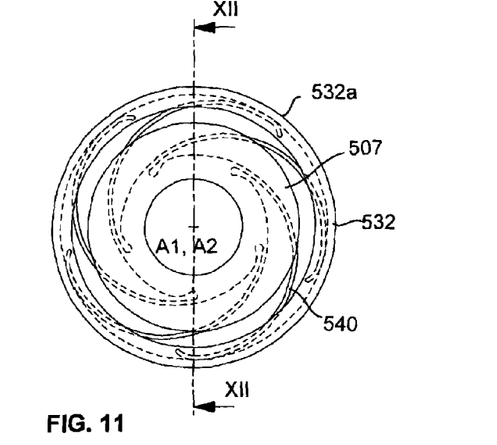
FIG. 11 is a side view of the segment of FIG. 9, the segment being at rest.

The central portion 531 has a cylindrical internal passage 531b, the plates extend tangentially from the outer surface of the central portion. Each spring plate 540 extends over approximately one third of a turn of the perimeter of the central portion 531, the angle α between the area of fixing the spring plate to the central portion and the free end 540a of the spring is of about 150°. The five spring plates 540 are arranged at regular angular spacing on the outer surface 531a, the points of fixing the plates to the central portion being disposed at 72° from each other.

The first part forming the spring plates 540 and the central portion 531 is mounted in the second part forming the peripheral portion 532, the end portions of the plates substantially tangentially abut against the cylindrical inner surface 532b of the peripheral portion formed by the inner surface of the base 5321, said end portions being positioned between the two branches 5322 of the peripheral portion.

The central part 531 has circular holes 521c at the junction zones of the spring plates to the central portion, to reduce the stresses exerted at said junctions, thereby reducing the risk of tearing.

Figure 13:
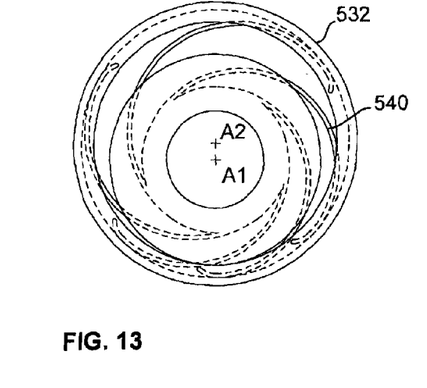
FIG. 13 is a side view of the segment of FIG. 11 when the segment is brought into abutment against an application surface.

At rest, as shown in FIG. 11, the peripheral portion 532 and the central portion 531 are coaxial. The spring plates 540 are in contact with and elastically in abutment against the inner surface 532b of the peripheral portion 532. When the segment is put in abutment against a contact surface, as shown in FIG. 13, the spring plates 540 enable a radial displacement of the peripheral portion 532, its axis A2 being shifted relative to the axis A1 of the peripheral portion 532.

Figure 14:
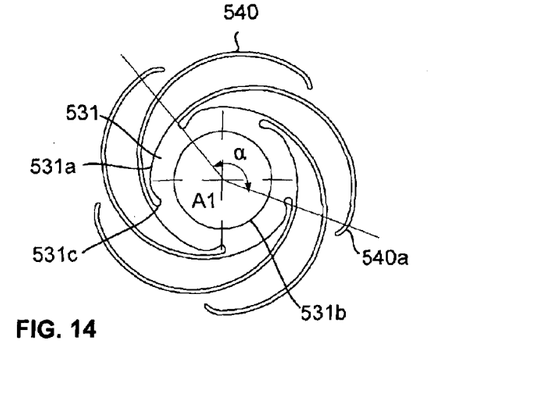
FIG. 14 is a side view of an element of the segment of FIG. 9.
Figure 15:
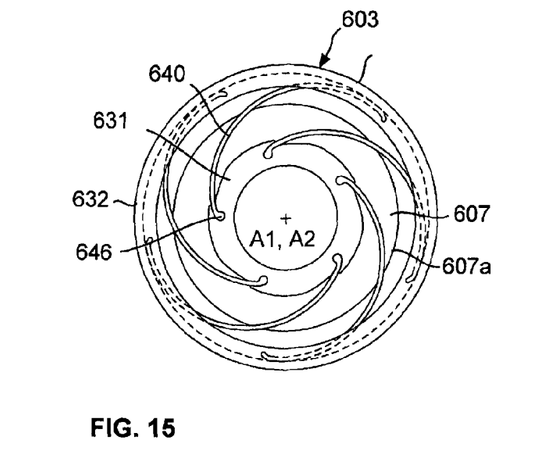
FIGS. 15 and 16 are respectively a side view and a front view of a roller segment according to a an alternative embodiment of the third embodiment.
Figure 16:
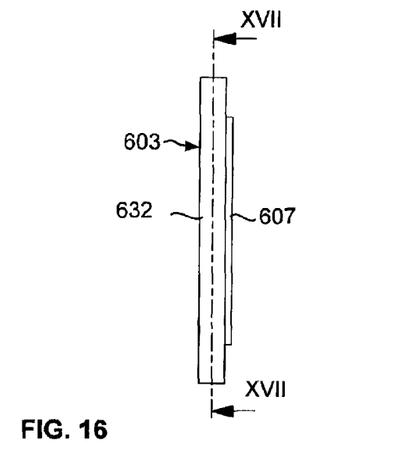
Figure 17:
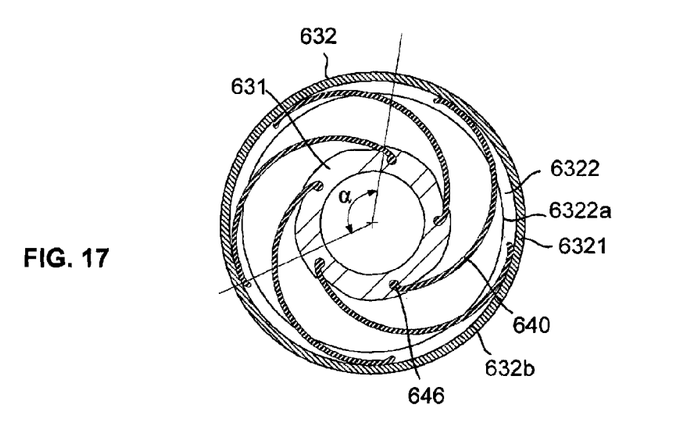
FIG. 17 is a cross-section view taken along the plane XVII-XVII in FIG. 16.
Figure 18:
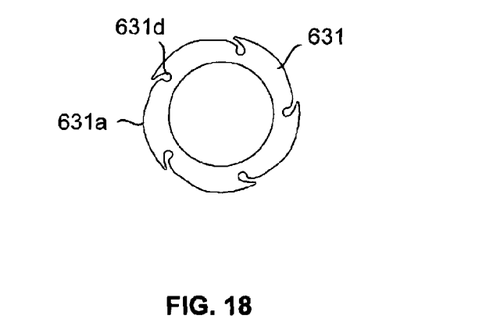
FIG. 18 is a side view of the central portion of the segment of FIG. 15.

In order to limit the radial displacement of the central portion 531, and thus avoid excessive elastic deformation of the spring plates 540, two annular disks 507 are disposed on both sides of each segment. Each disk comprises an internal passage 507b for mounting it onto the axial rod of the roller, and an outer circular edge 507a able to abut against the circular edge 5322a of a branch of the peripheral portion. The outer diameter of the disk 507 is set so that its outer edge 507a is spaced from the outer edge of the branches when the segment is at rest, as illustrated in FIG. 11. The maximum radial displacement of the central portion 531 is defined by the abutment of the disks against the branches of the peripheral portion 532, as shown in FIG. 13. In that so-called abutting position, all the plates are remain elastically in abutment against the peripheral portion. The segments 503 are mounted on the axial rod by inserting a disk 507 between two successive segments. The thickness of a disk 507 is set so that each disk interposed between two successive segments is able to abut against a branch of each segment. Each disk 507 is preferably mounted in rotationally fixed manner on the central portion of a segment, for example by means of screws.

Such mounting of plates, wherein the spring plates 540 are supported with the peripheral portion 532, allows a sliding between the peripheral portion 532 and the spring plates 540. This sliding prevents stress concentrations at the ends of the plates and allows for different rotational speeds of the peripheral portions 532 of the segments, in particular during the pivoting of the head substantially parallel to the application surface. The ends of the plates are advantageously curved inwardly to facilitate this sliding.

Alternatively, for the replacement of the peripheral portion of U-section to ensure the so-called axial blocking of the peripheral portion and central portion, the peripheral portion has a section that is generally T-shaped, the foot of the T extending radially inside. Each end portion of the spring plate comprises a slot for passage of the foot of the T and comes in abutment on either side of the foot against the internal surfaces of the bar of the T.

FIGS. 15 to 18 illustrate a segment 603 according to an alternative embodiment of the third embodiment.

The segment 603 comprises as previously a central portion 631 of axis A1, in the form of a ring having a cross-section generally in the shape of a U and a peripheral part 632 of axis A2 connected to each other by a plurality of spring plates 640, in particular six spring plates. The segment 603 differs from that described previously in that each plate 640 is formed of a separate part from that constituting the central portion 631. Each spring plate 640 is fixed at one end to the central portion 631 by a connecting dovetail type system. Each plate has a protuberance at the end 646 able to become lodged in a groove 631*d* of the corresponding shape formed on the outer surface of the central portion 631*a* and opening on at least one of opposite main sides of the central portion. In this embodiment, the grooves open on both main sides, the spring plates 640 being laterally engaged in the grooves by one of the main sides. The plates are mounted at regular angular spacing on the central portion 631, at 60° from each other and each extend over an angle α of about 120°. As before, the end portions of the spring plates 640 come between the branches 6322 of the peripheral portion 632 in abutment against the inner surface 632*b* of the base 6321 of the peripheral portion. Disk 607, able to abut with their outside edge 607*a* against the edge of the branches 6322*a*, are also used to guarantee the maintaining of the spring plates 640 in the grooves 631*d*. This embodiment allows the use of a rigid material, particularly metallic, perfectly suitable for the production of spring plates, which is different from the rigid material or materials, particularly metallic, used for the production of the central portion and the peripheral portion.

Although the invention has been described in conjunction with several specific embodiments, it is obvious that it is in no way limited thereto and includes all technical equivalents of the described means as well as their combinations if they are within the scope of the invention.

The invention claimed is:

1. A fiber application head for a fiber application machine, comprising a compacting roller, said compacting roller comprising a plurality of independent roller segments mounted side by side on an axial rod, wherein each roller segment comprises
   a tubular central portion through which said segment is mounted on the axial rod,
   a tubular peripheral portion, having a cylindrical outer surface and
   one or more curved spring plate arranged between the outer surface of the tubular central portion and an inner surface of the peripheral portion.

2. The head according to claim 1, wherein the convex surface of the spring plate is directed outwards.

3. The head according to claim 1, wherein each spring plate extends substantially tangentially from the outer surface of the central portion, and/or substantially tangentially from the inner surface of the peripheral portion.

4. The head according to claim 1, wherein each spring plate is fixed to the tubular central portion.

5. The head according to claim 1, wherein each segment is rotatably mounted on the axial rod.

6. The head according to claim 1, wherein each roller segment comprises a plurality of curved spring plates.

7. The head according to claim 6, wherein each curved spring plate extends over at least one third of a turn of the perimeter of the peripheral portion.

8. The head according to claim 1, wherein each segment comprises a single spring plate having more than one coil.

9. The head according to claim 1, wherein the curved spring plate or plates are fixed to the central portion, so that the central portion and the plate or plates are formed in one-piece.

10. The head according to claim 9, wherein each spring plate extends tangentially from the tubular central portion, said tubular central portion having a substantially circular hole at the junction of the spring plate to the central portion in order to reduce stress concentrations at said junction.

11. The head according to claim 1, wherein each spring plate is formed of a separate part from those forming the tubular central portion and the peripheral portion.

12. The head according to claim 1, wherein the peripheral portion is formed of a separate part from that of the tubular central portion.

13. The head according to claim 1, wherein each spring plate curved is fixed by a first end to the outer surface of the central portion, each plate coming against the inner surface of the peripheral portion and being able to slide against the latter.

14. The head according to claim 9, wherein for each segment, the peripheral portion, the central portion and the spring plate or plates are formed in one-piece, the plate or plates being obtained by performing one or more cuts in a disk of rigid material.

15. The head according to claim 1, wherein each segment comprises a stop means able to limit the radial displacement of the peripheral portion relative to the tubular central portion.

16. The head according to claim 13, wherein the stop means comprises for each segment at least one disk able to abut against a circular portion of the inner surface of the peripheral portion.

17. A fiber application machine comprising a fiber application head comprising a compacting roller and means for guiding the fibers onto said application roller, wherein it comprises a head according to claim 1.

* * * * *